Oct. 3, 1961  N. C. S. GRANT  3,002,694
SPRAY BARS FOR TAR AND THE LIKE SPRAYING MACHINES
Filed April 27, 1959  3 Sheets-Sheet 1

INVENTOR
N.C.S. GRANT
BY
ATTORNEY

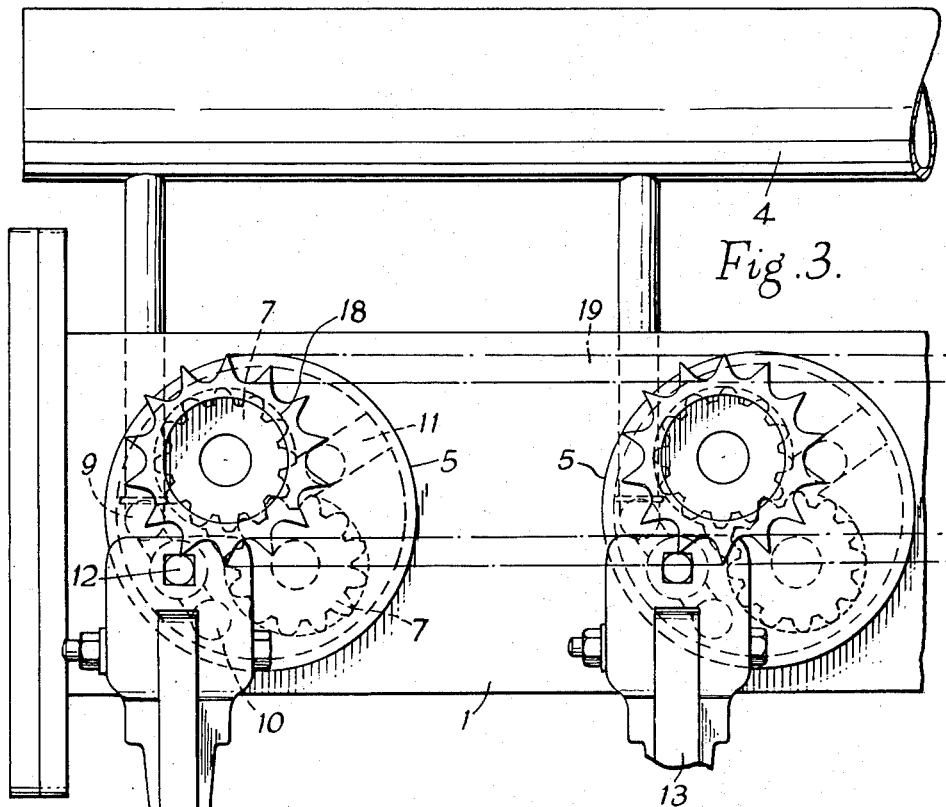
Fig. 3.
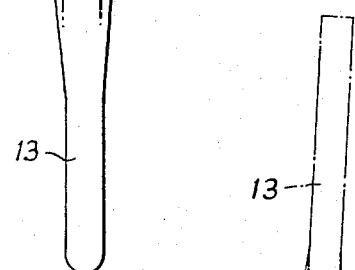
Fig. 4.
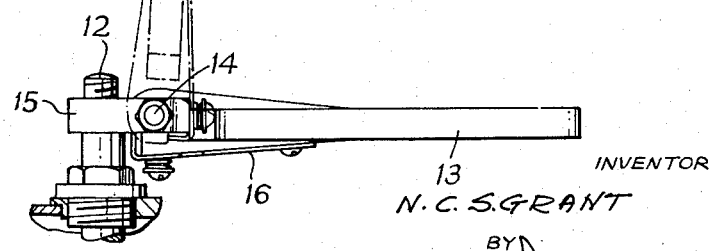

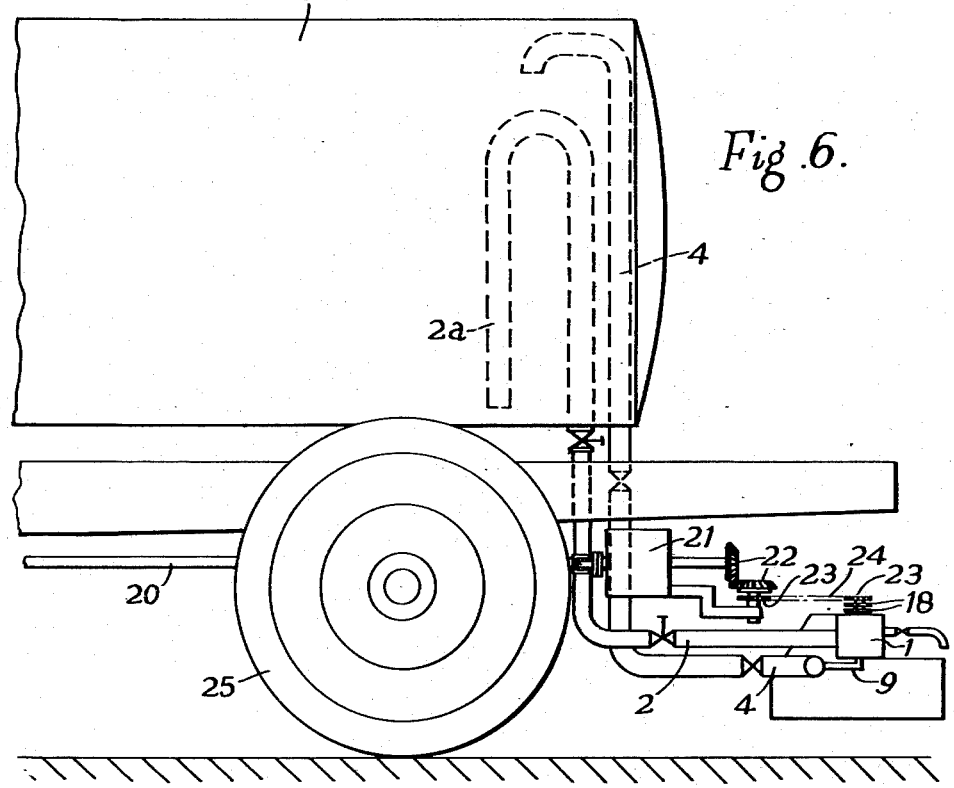

United States Patent Office 3,002,694
Patented Oct. 3, 1961

3,002,694
SPRAY BARS FOR TAR AND THE LIKE SPRAYING MACHINES
Norman Cecil Scott Grant, "Bower Holme,"
Shrubbs Hill, Lyndhurst, England
Filed Apr. 27, 1959, Ser. No. 809,045
5 Claims. (Cl. 239—127)

The present invention relates to spray bars for tar and like spraying machines.

Heretofore a single large capacity metering pump has been used for feeding tar or other liquid through a spray bar provided along its length with a plurality of spray jets. The disadvantage of this known arrangement is that pressure falls off along the length of the bar resulting in a fall off in the spray discharge from the jets remote from the pump.

Another disadvantage of this known arrangement is that it is not possible to shut off certain of the jets without increasing the amount of tar discharged from the remaining working jets unless some adjustment is made to the single large capacity metering pump.

The object of the present invention therefore is to overcome the above mentioned disadvantages and to provide a construction of spray bar which will result in a uniform quantity of tar being sprayed from all the jets and wherein also the amount of tar discharged from working jets is not increased when others are shut off.

Broadly, according to the present invention, there is provided a spray bar for spraying liquids, e.g. liquified tar, which is fitted along its length with spaced apart spray nozzles, which is characterised in that each jet is connected to its own metering pump which in turn is connected to a source of supply of the liquid.

According to a preferred embodiment of the invention the metering pumps for the jets are accommodated in spaced apart relation within the spray bar which is connected to a storage tank for the liquid to be sprayed and each metering pump is a gear pump comprising an inlet through which the liquid can be drawn from the spray bar into the pump and valve controlled outlets through which the liquid can be discharged either to the jet or to a return pipe leading to the storage tank.

Although the invention is primarily concerned with a spray bar for a tar spraying machine intended for spraying tar, bitumen mixtures or cold emulsions for treating the surface of a road, it is also applicable to spraying machines for spraying liquid insecticides or liquid fertiliser or the like.

To enable the invention to be clearly understood a preferred embodiment thereof will now be described by way of example with referenece to the accompanying drawings, wherein:

FIGURE 3 is a plan view of a part of the spray bar.

FIGURE 4 is a view showing means for actuating a valve associated witht each pump.

FIGURE 5 is a plan view showing the rear part of a vehicle carrying a supply tank fitted with the spraying mechanism of this invention, and FIGURE 6 is a side elevation of FIGURE 5.

Figure 1:
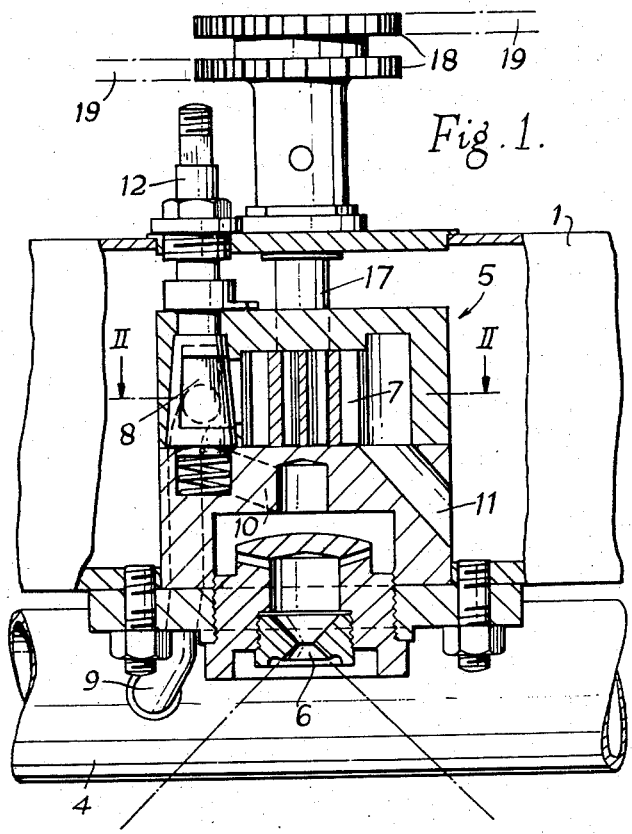
FIGURE 1 is a vertical section taken through one of the pumps.

Referring to the drawings, the spray bar 1, which is preferably, but not necessarily, square or rectangular in cross section, is connected by a supply pipe or tube 2 (FIGURE 6) leading from a main tank 3 for accommodating a bulk supply of the liquid to be sprayed and also a return pipe 4 through which the liquid is returned to the supply tank 3 when spraying is not being effected and the metering pumps 5 for controlling the jets 6 are accommodated in the spray bar 1 and spaced apart so that each pump is associated with a jet 6. The supply pipe 2 extends upwardly through the tank 3 and terminates in a goose-neck-like portion 2a opening just above the bottom of the tank 3.

With such an arrangement in which each jet 6 comprises its own metering pump 5 it will be appreciated that the pump will feed liquid tar to its associated jet at a constant rate and that therefore all the jets 6 will spray uniformly.

Figure 2:
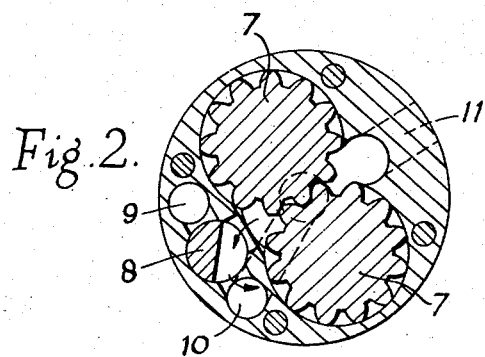
FIGURE 2 is a horizontal cross section taken on the line II—II of FIGURE 1.

The said pumps 5 are termed "metering" pumps in the trade because they are adapted to be driven at a speed which is proportionate to the road speed of the vehicle whereby a predetermined amount of tar is deposited on the surface being treated irrespective of the road speed within reasonable limits, for example, at say one or two miles per hour of the required optimum speed depending upon the nature of the material being sprayed. Each metering pump 5 is conveniently a gear pump comprising pumping gears 7 (FIGURES 1, 2 and 3) and incorporates a two way plug valve 8 whereby tar from the spray bar 1 can either pass through the pump by way of an inlet 11 to the spray nozzle 6, in which case an outlet 9 to the return pipe 4 is closed, or alternatively, tar can pass through the pump back to the return pipe 4 when an outlet 10 leading to the jet 6 is closed. Each pump 5 may be fitted with a spindle 12 extending from said valve 8, which is preferably a plug valve, and each spindle 12 is provided with an actuating link 13 by means of which the valve mechanism may be set as required. In this latter respect the arrangement permits some of the jets 6 being put out of action so that tar is fed back to the return pipe 4 while the remaining jets are allowed to spray.

Each link 13 (FIGURES 3 and 4) is pivoted at 14 to a part 15 adapted to be engaged with the upper end of a spindle 12 of a valve and in order that an operator can readily recognise which valves are connected to the jets 6 and which are connected to the return pipe 4 the links 13 are set in one of two positions indicated in full outline and chain-dotted outline in FIGURE 4 and are fitted with a springy arm 16 which maintains the link in one position or the other.

One of the gears 7 is fitted with a driving spindle 17 (FIGURE 1) and the upper end of each spindle 17 is fitted with two sprocket wheels 18 one of which is driven by a chain 19 and the other of which transmits the drive to an adjacent pump 5 by a like chain 19.

The drive to the sprocket wheels 18 may be taken from a power take-off shaft 20 (FIGURES 5 and 6) through a reduction gear 21 and by way of bevel gears 22 to sprocket wheels 23 and chain 24. Alternatively, the sprocket wheels 18 may be connected by a chain drive (not shown) to a sprocket wheel associated with one of the ground wheels 25 of the apparatus.

Although it is preferred to fit the pumps 5 and jets 6 in the spray bar 1, they may be fitted on the outside thereof if desired.

In addition to the feed pipe 2, the tank 3 may be fitted with valve-controlled pipes 26 and 27 by means of which the spray bar 1, with the pumps 5 working therein, can be caused to fill the supply tank 3 or even empty an outside supply tank into another outside supply tank, or spray through a hand lance.

Many advantages result from the construction provided by this invention, notably:

(a) No pressure is exerted by the liquid tar on the pipe 2 leading to the spray bar 1 or on the return pipe 4 to the tank 3 when spraying or circulating. The only pressure is in the swirling chambers of the jets 5.

(b) The advantage of the plurality of metering pumps 5 in the spray bar 1 over a single large metering pump is that any single or number of jets 6 can be shut off without putting back pressure on the pumps 5, pipes 2 and 4, or the spray bar 1, and it obviates the necessity of having very intricate relief valves to relieve each jet 6 when it is not spraying.

(c) Having a pump 5 for each jet 6 in the spray bar 1 gives an even output to each jet in any part of the spray bar, as there is no fall off of pressure on any part of the bar, as there is with constructions incorporating a large single pump.

(d) As all the pumps 5 are always running when the equipment is in operation and circulating or spraying, or when a number of jets are shut off, the wear of the pumps is all the same. Therefore, when the wear gets excessive and affects the output of the pumps, smaller jets can be fitted and so bring the output back to normal.

(e) The material being sprayed travels only a short distance from the pump to the jet, so that the binder or material, is under pressure for a very short time, thus avoiding scrubbing and turbulence, which is an advantage with some materials and binders.

(f) The metering spray bar 1 can fill its own supply tank 3 through the bar from an outside source or empty it. It can empty an outside supply tank into another outside tank and also spray through a hand lance.

(g) Having the pumps 5 in the spray bar 1 makes room for a larger supply tank 3 on the chassis or a small chassis can be used for the equipment.

(h) The goose neck pipe 2a in the tank 3 to feed the metering bar 1, and which goes up through the bottom of the tank to the top, returning down, and having the suction on the bottom of the tank, gives a constant flow of binder to the pumps 5 which are always sucking, and so the quantity of binder in the tank makes no difference to the output of the pumps, as it would do by gravity feed to the bar, such as a diminishing load.

(i) With the pumps 5 fitted inside the bar 1 they are always in the hot binder and not subject to change of temperature.

(j) The pumps 5 and jets 1 can be fitted in either a round or square section spray bar 1 and a width of up to 30'0" can be obtained with an even pressure from each jet for the full length of the bar.

(k) With the metering pumps 5 in the spray bar 1 the circulating and spraying system is below the tank 3. The tank 3 can be longer using a smaller oval for improved heating and, having a lower centre of gravity makes possible faster, safer travelling speeds to and from the working site. The tank is of improved appearance, and better load distribution saves on chassis tyres and makes for easier handling of the lorry.

(l) The two end metering pumps 5 in the metering spray bar 1 can be run faster or speeded up to give more output and so overcome the gap where the binder film is thin between the edge and the thick centre portion. One way to overcome this difficulty in the past was to fit baffles at the end of the bar, shaped in such a way as to deflect the tar into the thin portion of the spray, but by speeding up the two end metering pumps and giving a greater output for each than the other middle pumps, the thinness of film can be the same thickness as the centre of the spray.

I claim:

1. Apparatus for spraying liquid, e.g., liquified tar, comprising a spray bar having along its length a plurality of jets and within the bar a plurality of metering pumps, one for each jet, each pump including an inlet and a pair of outlets, said inlet communicating with the bar interior, a liquid return pipe for connection to a liquid supply source, a two-way control valve controlling said outlets and associated with each pump through which the liquid can be discharged either to the jet or to the return pipe.

2. Apparatus for spraying liquid, according to claim 1, in which the two-way control valve comprises an actuating valve spindle extending externally of the spray bar, a boss secured to the said spindle, a horizontal pivot on said boss, an actuating lever mounted on said pivot and locating means for resiliently locating said lever in a horizontal or vertical position.

3. Apparatus for spraying liquid, according to claim 1, in which each metering pump comprises a spindle, extending externally of the spray bar and driving means associated with each of the several spindles for driving said spindles in unison.

4. Apparatus for spraying liquid, e.g., liquified tar, comprising a road vehicle, a liquid storage tank mounted thereon, a spray bar having along its length a plurality of jets and within the bar, a plurality of metering pumps, one for each jet, each pump including an inlet and a pair of outlets, said inlet communicating with the bar interior, a liquid return pipe connected to said storage tank, a two-way control valve controlling said outlets and associated with each pump, through which the liquid can be discharged either to the jet or to the return pipe, a power take-off from said vehicle and pump driving means associated therewith for driving said pumps.

5. Apparatus for spraying liquid, e.g., liquified tar, comprising a road vehicle, a liquid storage tank mounted thereon, a spray bar communicating with said tank by means of a liquid supply pipe including, within the tank, a portion of said pipe in the form of a goose-neck which opens just above the bottom of the tank, a plurality of jets along the length of the spray bar and within the bar, a plurality of metering pumps, one for each jet, each pump including an inlet and a pair of outlets, said inlet communicating with the bar interior, a liquid return pipe connected to said storage tank, a two-way control valve controlling said outlets and associated with each pump, through which the liquid can be discharged either to the jet or to the return pipe, a power take-off from said vehicle and pump driving means associated therewith for driving said pumps.

References Cited in the file of this patent

UNITED STATES PATENTS 2,599,680    Weeks _____ June 10, 1952